(12) United States Patent
Bafna

(10) Patent No.: US 9,896,574 B2
(45) Date of Patent: *Feb. 20, 2018

(54) FILMS WITH IMPROVED DART IMPACT RESISTANCE

(71) Applicant: Dow Global Technologies LLC, Midland, MI (US)

(72) Inventor: Ayush A. Bafna, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 549 days.

This patent is subject to a terminal disclaimer.

(21) Appl. No.: 13/859,776

(22) Filed: Apr. 10, 2013

(65) Prior Publication Data

US 2014/0308480 A1    Oct. 16, 2014

(51) Int. Cl.
| | |
|---|---|
| *B32B 5/00* | (2006.01) |
| *B32B 27/00* | (2006.01) |
| *B32B 33/00* | (2006.01) |
| *C08L 23/00* | (2006.01) |
| *C08L 77/00* | (2006.01) |
| *C08L 23/06* | (2006.01) |
| *C08J 5/18* | (2006.01) |

(52) U.S. Cl.
CPC ............... *C08L 23/06* (2013.01); *C08J 5/18* (2013.01); *C08J 2323/06* (2013.01); *C08J 2433/04* (2013.01); *Y10T 428/24479* (2015.01)

(58) Field of Classification Search
CPC combination set(s) only.
See application file for complete search history.

(56) References Cited

U.S. PATENT DOCUMENTS

| | | |
|---|---|---|
| 4,377,616 A | 3/1983 | Ashcraft et al. |
| 4,632,869 A | 12/1986 | Park et al. |
| 4,758,462 A | 7/1988 | Park et al. |
| 4,950,718 A | 8/1990 | Burgert et al. |
| 5,334,657 A | 8/1994 | Swartzmiller et al. |
| 5,516,829 A | 5/1996 | Davis et al. |
| 5,691,043 A | 11/1997 | Keller et al. |
| 6,528,155 B1 | 3/2003 | Kong et al. |
| 2008/0233375 A1* | 9/2008 | Wright et al. ............. 428/219 |

FOREIGN PATENT DOCUMENTS

WO    97/30841 A1    8/1997

OTHER PUBLICATIONS

International Search Report and Written Opinion of the International Searching Authority for PCT/US2014/033411, Aug. 28, 2014, pp. 1-9.
International Prelimineary Report on Patentability for PCT/US2013/033411, Oct. 1, 2014, pp. 1-7.

* cited by examiner

*Primary Examiner* — Ana Woodward

(57) ABSTRACT

The present disclosure relates to multilayer thermoplastic films particularly suited for use in liners. The films contain organic fillers to produce opacity when stretched while maintaining an MD Tear Strength of at least 200 gm and a Dart Impact of at least 200 gm. Such performance can be maintained by selection and amounts of resins, organic fillers and processing conditions of the films.

19 Claims, No Drawings

FILMS WITH IMPROVED DART IMPACT RESISTANCE

The present disclosure relates to monolayer or multilayer thermoplastic films particularly suited for use in applications where improved abuse resistance or specifically dart impact resistance is required. The films contain organic filler that improves the dart impact resistance of the film while maintaining other key film properties. Such performance can be achieved by selection of the right organic filler for the films.

BACKGROUND AND SUMMARY OF THE INVENTION

It is desirable for plastic films, particularly those used to store and transport materials, to be resistant to damage from sudden impact. Trash bags are a very good example where failure resistance to sudden impact is highly valued. Additionally, thin films that exhibit high strength requirements provide a better cost-performance relationship for the consumer. Currently, such films are most commonly produced from polyolefin films, including polyethylene films and preferably linear low density polyethylene (LLDPE) films.

For many years, high performance polyolefins, such as low density polyethylene (LDPE), have been readily available at a low manufacturing cost sufficient to justify commercial use in trash bags, including heavy duty garbage bags, leaf bags and trash can liners. The use of polyethylene, more particularly low density polyethylene, allows for the production of liners with remarkably thin gauge and flexibility while maintaining high strength characteristics such as puncture toughness and ultimate tensile strength.

More recently, linear low density polyethylene (LLDPE) has been used in place of conventional highly branched LDPE in many film applications, including bags or liners. LLDPE is widely recognized as being tougher and stronger than LDPE, thus contributing to reduced bag failures, including punctures and splitting under stress. In particular, LLDPEs made with metallocene or single site catalysts have been used to provide improved toughness.

Typically, dart impact resistance of an LLDPE based film at a constant film thickness is increased by using LLDPE's with either higher molecular weight or narrower molecular weight distribution (MWD) or lower density. Each of these options has some concerns. At a fixed extruder output, using a LLDPE with higher molecular weight or narrower MWD significantly increases the extrusion pressure, and the load on the extruder. If the film manufacturer is limited on extruder pressure, using higher molecular weight or narrower MWD LLDPE is not an option. On using an LLDPE with lower density, the stiffness of the film decreases and hence the film is perceived to be weak by consumers. It is of value to develop a film formulation that would run on existing extruders without causing any extrusion issues and not reduce film stiffness.

The present invention achieves this goal by providing a film formulation comprising a polymer and at least one organic filler, said polymer comprising a polyethylene polymer having a density less than 0.970 g/cm$^3$ and a melting point less than 137° C. and said organic filler having elasticity lower than that of the polyethylene. The films can be characterized by having dart impact resistance at least 10% higher than that of the film without the organic filler.

DETAILED DESCRIPTION OF INVENTION

The present invention relates to certain film formulation having improved properties. Films according to this invention provide improved dart impact resistance. Such films are ideally suited for use in trash bag or trash liner, heavy duty shipping sack, mattress film, food storage, frozen food storage, fertilizer storage, silage and grain storage applications.

The films of the present invention comprise a polymer and at least one organic filler, said polymer comprised a polyethylene polymer having a density less than 0.970 g/cm$^3$ and a melting point less than 137° C. and said organic filler has elasticity lower than that of the polyethylene. The films can be characterized by having dart impact resistance at least 10% higher than that of the film without the organic filler The polymer for use in the present invention is an ethylene copolymer. Preferred ethylene copolymers are derived from units of ethylene and at least one $C_3$ to $C_{20}$ alpha-olefin comonomer. More preferably, the alpha-olefin comonomer comprises butene, hexene, octene or pentene. In some embodiments of this invention, the ethylene copolymer may be selected from the group consisting of LLDPE, very low density polyethylene (VLDPE), elastomers and plastomers. The ethylene copolymer may be prepared using any catalyst known in the art, including heterogeneous Zeigler-Natta catalyst or homogeneous single site or metallocene catalysts. Blends of two or more different ethylene copolymers are also contemplated.

The polymer should have a density, as determined by ASTM D792, equal to or less than 0.970 g/cm$^3$. More preferably, the density of the ethylene copolymer is equal to or less than 0.945 g/cm$^3$, more preferably equal to or less than 0.930 g/cm$^3$, and even more preferably less than or equal to 0.920 g/cm$^3$. Further, in preferred embodiments of this invention, the ethylene copolymer has a Melt Index (as determined by ASTM D1238: 1999 190° C., 2.16 kg) ranging from 0.1 g/10 min. to 5.0 g/10 min. The first to polymer also has a melting point (as determined by ASTM D3418-03) less than or equal to 137° C., more preferably less than or equal to 128° C.

Examples of suitable polymer are DOWLEX™ 2020G, 2285G, 2085G, 2045G, 2049G, 2038.68G, ATTANE™ 4201, 4203, 4703 and 4202 (all commercially available from The Dow Chemical Company of Midland, Mich.), LL1001, LL1002, LL2001, LL3002, LL3003.32 and NTX 095 (commercially available from ExxonMobil Chemical Company of Baytown, Tex.). Examples of suitable mLLDPEs and mVLDPEs are ELITE™ 5400G, 5100G, 5230G and 5111G (all commercially available from The Dow Chemical Company of Midland, Mich.), EXCEED™ 1012, 1018, 1015, 3512, 3518 and 2018 metallocene polyethylenes (commercially available from ExxonMobil Chemical Company of Baytown, Tex.). And, examples of suitable plastomers and elastomers are ENGAGE™ thermoplastic polyolefin elastomers and AFFINITY™ polyolefin plastomers (both commercially available from The Dow Chemical Company of Midland, Mich.), EXACT™; 5361, 4049, 5371, 8201, 4150, 5181, 3132 ethylene plastomers (commercially available from ExxonMobil Chemical Company of Baytown, Tex.).

The film further comprises one or more organic fillers. The organic fillers may be present such that the total amount of fillers in the whole film is from 0.5 to 20% by weight of the film. In some embodiments, the filler is present in the first layer in an amount ranging from 0.75 wt % to 15 wt %, preferably from 1.0 wt % to 10 wt %, more preferably from 1.5% to 5%, most preferably from 2% to 4% by weight of the film. Fillers may include any suitable organic particulate material that is incompatible with the polymer material. The filler(s) may, for example, be any of those organic fillers described in U.S. Pat. Nos. 4,377,616, 4,632,869 and 5,691, 043, the entire disclosures of which are incorporated herein by reference. Specific examples, but not limited to, of suitable organic fillers for use in the present invention are polyamides, polyesters, acetals, nylons, acrylic resins, cyclo-olefin polymers and copolymers, polybutylene terephthalate, nylon, polystyrene, high impact polystyrene, acrylic beads, crosslinked acrylate beads, hollow acrylate beads, crosslinked styrenic beads, and combinations thereof. In some embodiments, it may be preferred that the filler comprises an organic material, with high impact polystyrene, crosslinked styrenic beads, and crosslinked acrylate beads, being particularly preferred for some applications. The particle size d50, of the filler particles when dispersed in the polyethylene matrix typically may be from 0.1 μm to 10 μm, preferably from 0.5 μm to 5 μm, more preferably from 0.7 μm to 2.5 μm. The particle size d90 of the filler particles when dispersed in the polyethylene matrix will be less than 5 times its d50. For example, if a particle type with d50 of 2 μm is used, this particle would have a d90 of less than 20 μm.

Particle Size d50 is also known as the median diameter or the medium value of the particle size distribution, it is the value of the particle diameter at 50% in the cumulative distribution. It is one of an important parameter characterizing particle size. For example, if d50=2.0 μm, then 50% of the particles in the sample are smaller than 2.0 μm, and 50% larger than 2.0 μm. d50 is usually used to represent the particle size of group of particles. d90 allows one to understand the amount of large particles in the particle size distribution. For example, if d90=10.0 μm, then 90% of the particles in the sample are smaller than 10.0 μm, and 10% larger than 10.0 μm.

The film may advantageously further include a plasticizer. As is known to those skilled in the art, plasticizers are typically used to soften polymer chains, thereby increasing the workability and flexibility of the polymer. Additionally, plasticizers are known to combine with the amorphous regions of LLDPE and extend the degree of polymer chain entanglement, thus increasing the elasticity of the polymer sheet at elevated temperatures. In the current invention, the increased elasticity may contribute to improved processability upon orientation. Plasticizers for use with the current invention include amorphous or semi-crystalline polymers with a melting point less than about 125° C. or processing additives such as white oil. Examples of suitable plasticizers are LDPE, VLDPE, ethylene vinyl acetate (EVA) copolymers, ethylene acrylic acid (EAA) copolymers, ethylene-ethyl acrylate (EEA) copolymers, propylene plastomers and elastomers, ethylene plastomers and elastomers, polyolefin adhesive materials, hydrocarbon and natural resins, waxes (including synthetic, micro-crystalline and paraffinic waxes), poly-alpha-olefins, low melt temperature ethylene polymers or copolymers, ethylene propylene copolymers or terpolymers, or combinations thereof. Commercially available plasticizers that may be suitable for use as described herein include, but are not limited to, VERSIFY™ Plastomer, INFUSE™ Olefin Block Copolymer, ENGAGE™ thermoplastic polyolefin elastomers and AFFINITY™ polyolefin plastomers (all commercially available from The Dow Chemical Company to of Midland, Mich.), VISTAMAXX™, EXACT™, ESCORENE™; ULTRA LD-720.92, OPPERA™; PA-851N, PA-702N and ELEVAST™ (all commercially available from ExxonMobil Chemical Company of Baytown, Tex.) and BE SQUARE™; microcrystalline wax (commercially available from Baker Petrolite of Sugarland, Tex.).

In some embodiments of the present invention, plasticizers may be present in the film in an amount ranging from 0 wt % to 60 wt %, preferably ranging from 2 wt % to 20 wt %.

The film may further comprise one or more additives such as pigments, colorants, slip agents, antiblocks, antioxidants, anti-fog agents, anti-static agents, fillers, moisture barrier additives, gas barrier additives and combinations thereof, as discussed in further detail below. In some preferred embodiments, the film includes a color pigment. Such pigment can be added directly to the film. For organic fillers, the color pigment may advantageously be dispersed in the filler, and for inorganic fillers, the color pigment may advantageously coat the filler. Titanium dioxide and carbon black may be preferred color pigments for certain applications.

Preferably, the total amount of additives, including fillers, in the film ranges from 0.2 wt % to 40.0 wt %, more preferably from 1.0 wt % to 20.0 wt %.

In some embodiments, the film has a thickness in the range of from 5 μm to 500 μm, alternatively from 10 μm to 100 μm, or from 12 μm to 50 μm.

The films of the present invention may include further layers. Such layers may provide additional functionality, but must be chosen so as to be compatible with the other film layers and so as not to detrimentally affect the overall film properties. If additional layers are present it may be preferred to arrange the layers such that the layer with the organic filler is not a surface layer for applications where glossy film is needed. If additional layers are present it may be preferred to arrange the layers such that the organic filler is also present in the surface layer for applications where matt finish film is needed. In some embodiments it may be preferred that at least one of the layers comprise a second polymer wherein said second polymer comprises a polar or non-polar ethylene copolymer or a propylene copolymer, wherein said third polymer is characterized by having a modulus which is at least 10% less than the modulus of the first polymer.

It is preferred that the films of the present invention be formed in the blown film or cast film process as is generally known in the art, although other methods such as lamination can be used.

The films of the present invention may be subjected to a post-quench orientation step where the film is stretched at a temperature below the melting point of any polyethylene used in the film. The degree of stretching could be from 1.1:1 to 3.5:1 in the machine direction or the transverse direction or both directions. The degree of stretching is the ratio of the original film thickness to that of the film thickness of the stretched portion of the film. So the portion of the film that originally was 100 micron after a 3:1 stretch ratio would be 33 micron. In some embodiments the post-quench stretching is less than 3:1, 2.5:1, 2:1, or 1.5:1 in the machine direction, the transverse direction or both directions. In some preferred embodiments, the stretching is done in only one direction (that is, monoaxial orientation). In such cases, it may be preferred that the orientation be only in the transverse direction.

The stretching can be conducted using tenter frames or other methods which uniformly stretch the films. Alternatively, the films may be stretched by techniques which stretch the film in a non-uniform manner such that localized regions of the film remain unstretched. Such techniques include local stretching, interdigitized rollers or embossing techniques. It should be understood that with such localized stretching, the degree of stretching referred to above for some embodiments (that is from 1.1 to 3.5 to 1) refers to the stretch in the area which were subjected to the stretching and not the overall film.

The resulting films of the present invention can be characterized by their superior ultimate tensile strength, Tear Strength and Dart Impact. Tear Strength is measured by ASTM D-1922. Dart Impact is measured by ASTM D-1709. Film ultimate tensile is measured using ASTM D-882. The films of the present invention will have significantly improved Dart impact resistance and similar MD Tear and ultimate tensile properties when compared to the film without any organic filler.

Additives

Additives that may be present in one or more layers of the multi-layer films of this invention, include, but are not limited to opacifying agents, pigments, colorants, slip agents, antioxidants, anti-fog agents, anti-static agents, anti-block agents, fillers, moisture barrier additives, gas barrier additives and combinations thereof. Such additives may be used in effective amounts, which vary depending upon the property required. Slip agents, antiblocking agents, anti-static agents, antioxidants and anti-fog agents are particularly effective when used in the outer layer(s) of the films of the present invention.

Pigments and colorants are typically added to polymers to impart opacity and, in some cases, particular color to the resulting films. Examples of pigments or colorants for use with the current invention are iron oxide, carbon black, colored pigments, aluminum, titanium dioxide ($TiO_2$), calcium carbonate (CaCO3), polybutylene terephthalate, talc, and combinations thereof. Colored pigments and colorants include agents that may be added to the polymer to impart any desired shade of color such as pink, blue, green, yellow, etc. Pigments and colorants may also contribute to the desirable optical qualities of the films of the current invention by imparting color and a pearlescent appearance that appeal to consumers.

Slip agents may include higher aliphatic acid amides, higher aliphatic acid esters, waxes, silicone oils, and metal soaps. Such slip agents may be used in amounts ranging from 0.05 wt % to 2 wt % based on the total weight of the layer to which it is added. An example of a slip additive that may be useful for this invention is erucamide.

Suitable anti-oxidants may include phenolic anti-oxidants, such as IRGANOX™ 1076 (commercially available from Ciba-Geigy Company of Switzerland) and phosphite anti-oxidants such as IRGANOX™ 168 (also commercially available from Ciba Geigy Company of Switzerland.) Such anti-oxidants are generally used in amounts ranging from 0.1 wt % to 2 wt %.

Anti-static agents may include alkali metal sulfonates, polyether-modified polydiorganosiloxanes, polyalkylphenylsiloxanes, and tertiary amines. Such anti-static agents may be used in amounts ranging from 0.05 wt % to 3 wt %, based upon the total weight of the layer(s).

Anti-blocking agents useful in this invention may include finely divided inorganic solid materials such as silica, fumed silica, diatomaceous earth, calcium carbonate, calcium silicate, aluminum silicate, kaolin, talc, bentonite, clay and pulp. Examples of suitable fillers and anti-blocking agents may include SYLOBLOC™ 44 (commercially available from Grace Davison Products of Colombia, Md.), or polysiloxanes such as TOSPEARL™; (commercially available from GE Bayer Silicones of Wilton, Conn.). Such fillers and anti-blocking agents comprise an effective amount up to 30000 ppm of the weight of the layer(s) to which they are added.

Suitable moisture and gas barrier additives may include effective amounts of low-molecular weight resins, hydrocarbon resins, particularly petroleum resins, styrene resins, cyclopentadiene resins, and rosin and terpene derived resins.

Optionally, the film may be compounded with a wax or coated with a wax-containing coating, for lubricity, in amounts ranging from 1 wt % to 15 wt % based on the total weight of the skin layer. Wax-containing coatings may also be applied to an outer surface of a monolayer film. Any conventional wax, such as, but not limited to Carnauba™; wax (commercially available from Michelman Corporation of Cincinnati, Ohio), that is useful in thermoplastic films is contemplated.

The prepared films may be used in trash bags including kitchen trash bags, heavy duty garbage bags, leaf bags, trash can liners and other similar applications.

EXAMPLES

In order to demonstrate the effectiveness of the organic fillers to improve film dart resistance and prevent degradation in MD Tear and tensile strength, films (examples 1-5) were made on a blown film line equipped with 70 mil die gap, 2.5 inch diameter die, 50 lb/hr output, ~25 inch frost line height, 2.5 Blow Up Ratio (BUR) and ~400 degree F. melt temperature.

Example 1 is a monolayer blown film with 1.0 mil thickness containing 95% LLDPE (1.0 dg/min Melt Index (2.16 kg load, 190 degreeC), 0.919 g/cc density) blended with 5% white color concentrate (50% Titanium Dioxide concentrate in LLDPE).

Example 2 is a monolayer blown film with 1.0 mil thickness containing 90% LLDPE (1.0 dg/min Melt Index (2.16 kg load, 190 degreeC), 0.919 g/cc density), 2% by weight crosslinked acrylate beads, with specific gravity ~1.05 g/cc and particle size d50 close to 0.85 μm and particle size d90 close to 1.2 μm, as a filler, and 2.5% by weight pigment (Titanium Dioxide).

Example 3 is a monolayer blown film with 1.0 mil thickness containing 90% LLDPE (1.0 dg/min Melt Index (2.16 kg load, 190 degreeC), 0.919 g/cc density), 5% by weight crosslinked acrylate beads, with specific gravity ~1.05 g/cc and particle size d50 close to 0.85 μm and particle size d90 close to 1.2 μm, as a filler, and 2.5% by weight pigment (Titanium Dioxide).

Example 4 is a monolayer blown film with 1.0 mil thickness containing 90% LLDPE (1.0 dg/min Melt Index (2.16 kg load, 190 degreeC), 0.919 g/cc density), 2% by weight crosslinked acrylate beads, with specific gravity ~1.05 g/cc and particle size d50 close to 5.6 μm and particle size d90 close to 8.2 μm, as a filler, and 2.5% by weight pigment (Titanium Dioxide).

Example 5 is a monolayer blown film with 1.0 mil thickness containing 90% LLDPE (1.0 dg/min Melt Index (2.16 kg load, 190 degreeC), 0.919 g/cc density), 5% by weight crosslinked acrylate beads, with specific gravity ~1.05 g/cc and particle size d50 close to 5.6 μm and particle size d90 close to 8.2 μm, as a filler, and 2.5% by weight pigment (Titanium Dioxide).

In order to understand the effect of inorganic voiding agent addition on film performance, films (examples 6-8) were made on an Egan blown film line that is equipped with a 3 inch die and 2 inch (24:1 L/D) polyethylene screw. BUR of 2.5 was used a FLH of 12 inch was maintained. Melt temperature was close to 500 degree F.

Example 6 is a monolayer blown film with 1.0 mil thickness containing 100% LLDPE (1.0 dg/min Melt Index (2.16 kg load, 190 degreeC), 0.920 g/cc density).

Example 7 is a monolayer blown film with 1.0 mil thickness containing 95% LLDPE (1.0 dg/min Melt Index (2.16 kg load, 190 degreeC), 0.920 g/cc density) and 5% Calcium Carbonate.

Example 8 is a monolayer blown film with 1.0 mil thickness containing 95% LLDPE (1.0 dg/min Melt Index (2.16 kg load, 190 degreeC), 0.920 g/cc density) and 5% Kaolin Clay.

Physical properties of all films were measured and are reported in table 1 and 2 below:

TABLE 1

Film properties for formulations without (example 1) and with (example 2-5) organic filler.

| Sample ID | Tensile break - MD psi | Tensile break - CD psi | Tear- MD grams/mil | Tear- CD grams | Dart Impact grams |
|---|---|---|---|---|---|
| Example 1 | 4953 | 3487 | 391 | 648 | 232 |
| Example 2 | 5956 | 3540 | 417 | 739 | 304 |
| Example 3 | 4785 | 3745 | 453 | 699 | 532 |
| Example 4 | 4537 | 3468 | 438 | 667 | 391 |
| Example 5 | 4197 | 2927 | 476 | 648 | 558 |

TABLE 2

Film properties for formulations without (example 6) and with (examples 7-8) inorganic filler.

| Sample ID | Tensile break - MD psi | Tensile break - CD psi | Elmendorf Tear - MD grams | Dart Impact grams |
|---|---|---|---|---|
| Example 6 | 8547 | 7241 | 263 | 290 |
| Example 7 | 6458 | 4928 | 136 | 295 |
| Example 8 | 5861 | 4322 | 180 | 230 |

From table 1 it is clear that addition of organic filler does significantly increase film dart impact resistance while maintaining or in some cases even improving other film properties like MD Tear strength and ultimate tensile strength (tensile break). From table 2 it is clear that addition of inorganic filler does not improve film dart impact resistance but significantly deteriorates most of the film properties, especially MD tear strength and ultimate tensile strength (tensile break).

Therefore use of organic filler allows one to significantly upgrade film dart impact resistance while maintaining or improving other film properties (MD tear and ultimate tensile strength).

The following embodiments are expressly considered to be part of the present invention although each embodiment may not be separately claimed.

1. A film comprising a polymer and at least one filler, said polymer comprising a polyethylene polymer having a density less than 0.970 g/cm$^3$, a melting point less than 137° C., melt index between 0.1 dg/min to 5.0 dg/min; said filler is organic in composition and when dispersed in polyethylene has particle size d50 from 0.1 micron to 10 micron, particle size d90 less than 5 times d50, and said film has significantly higher dart impact strength and similar MD Tear strength and ultimate tensile strength when compared to a film without the organic filler.

2. The film of embodiment 1 wherein the Dart Impact is at least 20% higher than the film without organic filler.
3. The film of embodiment 1 wherein the Dart Impact is at least 40% higher than the film without organic filler.
4. The film of embodiment 1 wherein the Dart Impact is at least 60% higher than the film without organic filler.
5. The film of embodiment 1 wherein the film is a blown film.
6. The film of embodiment 1 wherein the film is a cast film
7. The film of embodiment 1 wherein optionally some portion of the film is stretched in the machine direction or the transverse direction or both directions.
8. The film of Embodiment 7 wherein the film has been stretched using a local stretching technique.
9. The film of Embodiment 7 wherein the film has been stretched using an embossing technique.
10. The film of Embodiment 1 wherein the organic filler is selected from the group consisting of polybutylene terephthalate, polystyrene, high impact polystyrene, polyamides, cyclic olefin polymers and copolymers, nylons, polyesters, acetals, acrylic resins, acrylic beads, crosslinked acrylic beads, crosslinked styrenic beads or combinations thereof.
11. The film of Embodiment 1 wherein the filler comprises a material selected from the group consisting of polystyrene, polyacrylate, polyamide, cyclic-olefin copolymers, acrylate beads, crosslinked acrylate beads, crosslinked styrenic beads, high impact polystyrene or combinations thereof.
12. The film of Embodiment 1 wherein the filler comprises a material selected from the group consisting of crosslinked acrylate beads, crosslinked styrenic beads or high impact polystyrene.
13. The film of Embodiment 1 wherein the filler comprises a material selected from the group consisting of crosslinked acrylate beads.
14. The film of Embodiment 1 wherein the filler comprises a material selected from the group consisting of crosslinked styrenic beads.
15. The film of Embodiment 1 wherein the filler on dispersion into the polymer gets dispersed as particles with average particle size (d50) between 0.1 micron and 10 micron.
16. The film of Embodiment 1 wherein the filler on dispersion into the polymer gets dispersed as particles with average particle size (d50) between 0.5 micron and 7 micron.
17. The film of Embodiment 1 wherein the filler on dispersion into the polymer gets dispersed as particles with average particle size (d50) between 0.7 micron and 5 micron.
18. The film of Embodiment 1 wherein the filler on dispersion into the polymer gets dispersed as particles with average particle size (d50) between 0.8 micron and 2 micron.
19. The film of Embodiment 1 wherein the filler on dispersion into the polymer gets dispersed as particles with average particle size (d90) less than 5 times d50.
20. The film of Embodiment 1 wherein the filler on dispersion into the polymer gets dispersed as particles with average particle size (d90) less than 3.5 times d50.
21. The film of Embodiment 1 wherein the filler on dispersion into the polymer gets dispersed as particles with average particle size (d90) less than 2.0 times d50.
22. The film of Embodiment 1 wherein the filler is at least 0.5% to 20% by weight of the film.

23. The film of Embodiment 1 wherein the filler is at least 0.75% to 15% by weight of the film.
24. The film of Embodiment 1 wherein the filler is at least 1.0% to 10% by weight of the film.
25. The film of Embodiment 1 wherein the filler is at least 1.5% to 5% by weight of the film.
26. The film of Embodiment 1 wherein the filler is at least 2.0% to 4% by weight of the film.
27. The film of Embodiment 1 wherein the film comprises a color pigment.
28. The film of Embodiment 27 wherein the color pigment comprises titanium dioxide or carbon black.
29. The film of embodiment 1 characterized in that it has a thickness of from 0.5 mil to 20.0 mil prior to any stretching step.
30. The film of embodiment 1 characterized in that it has a thickness of from 0.7 mil to 10 mil prior to any stretching step.
31. The film of embodiment 30 characterized in that it has a thickness of from 0.8 mil to 2.0 mil prior to any stretching step.
32. The film of embodiment 1 wherein the polyethylene polymer is a linear low density polyethylene copolymer having a density in the range of from 0.868 g/cm³ to 0.970 g/cm³.
33. The film of embodiment 1 wherein the polyethylene polymer is a linear low density polyethylene copolymer having a density in the range of from 0.900 g/cm³ to 0.940 g/cm³.
34. The film of embodiment 1 wherein the polyethylene polymer is a linear low density polyethylene copolymer having a density in the range of from 0.910 g/cm³ to 0.930 g/cm³.
35. The film of embodiment 1 wherein the polyethylene polymer is a linear low density polyethylene copolymer having a density in the range of from 0.915 g/cm³ to 0.928 g/cm³.
36. The film of embodiment 1 wherein the film further comprises a second polymer wherein said second polymer comprises a polar or non-polar ethylene copolymer or a propylene copolymer, wherein said third polymer is characterized by having a modulus which is at least 10% less than the modulus of the first polymer.
37. The film of embodiment 1 has one or more additional layers.
38. The film of embodiment 1 further comprising one or more additives selected from the group consisting of slip agents, antiblocking agents, anti-static agents, anti-oxidants or anti-fog agents in at least the second layer.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A film comprising an ethylene copolymer and at least one organic filler dispersed in the ethylene copolymer, said ethylene copolymer having a density less than 0.970 g/cm³, a melting point less than 137° C., and a melt index ranging from 0.1 dg/min to 5.0 dg/min;
said organic filler when dispersed in the ethylene copolymer has a particle size d50 of from 0.1 micron to 10 micron, and a particle size d90 of less than 5 times d50; and
said film has a higher dart impact strength when compared to a film without the organic filler.

2. The film of embodiment 1 wherein the Dart Impact is at least 20% higher than the film without organic filler.
3. The film of claim 1 wherein the film is a blown film.
4. The film of claim 1 wherein the film is a cast film.
5. The film of claim 1 wherein some portion of the film is stretched in the machine direction or the transverse direction or in both directions.
6. The film of claim 5 wherein the film has been stretched using a local stretching technique.
7. The film of claim 5 wherein the film has been stretched using an embossing technique.
8. The film of claim 1 wherein the organic filler comprises polybutylene terephthalate, polystyrene, high impact polystyrene, polyamides, cyclic olefin polymers and copolymers, nylons, polyesters, acetals, acrylic resins, acrylic beads, crosslinked acrylic beads, crosslinked styrenic beads or combinations thereof.
9. The film of claim 1 wherein the filler comprises polystyrene, polyacrylate, polyamide, cyclic-olefin copolymers, acrylate beads, crosslinked acrylate beads, crosslinked styrenic beads, high impact polystyrene or combinations thereof.
10. The film of claim 1 wherein the filler on dispersion into the polymer gets dispersed as particles with average particle size (d50) from 0.1 micron to 10 micron.
11. The film of claim 1 wherein the filler on dispersion into the polymer gets dispersed as particles with average particle size (d50) from 0.8 micron to 2 micron.
12. The film of claim 1 wherein the filler on dispersion into the polymer gets dispersed as particles with average particle size (d90) less than 5 times average particle size d50.
13. The film of claim 1 wherein the filler on dispersion into the polymer gets dispersed as particles with average particle size (d90) less than 2.0 times average particle size d50.
14. The film of claim 1 wherein the filler is present in an amount of from 0.5% to 20% by weight of the film.
15. The film of claim 1 wherein the filler is present in an amount of from 2.0% to 4% by weight of the film.
16. The film of claim 1 wherein the film comprises a color pigment comprising titanium dioxide or carbon black.
17. The film of claim 1 characterized in that it has a thickness of from 0.5 mil to 20.0 mil prior to any stretching step.
18. The film of claim 1 wherein the ethylene copolymer is a linear low density polyethylene copolymer having a density in the range of from 0.915 g/cm³ to 0.928 g/cm³.
19. The film of claim 1 having one or more additional layers.

* * * * *